US010090020B1

United States Patent
Bentley et al.

(10) Patent No.: US 10,090,020 B1
(45) Date of Patent: Oct. 2, 2018

(54) CONTENT SUMMARIZATION

(71) Applicant: Amazon Technologies, Inc., Seattle, WA (US)

(72) Inventors: Peter Van Tuyl Bentley, Seattle, WA (US); Matthew Alan Townsend, Redwood City, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 323 days.

(21) Appl. No.: 14/755,788

(22) Filed: Jun. 30, 2015

(51) Int. Cl.
G11B 27/06 (2006.01)
G11B 27/00 (2006.01)
G11B 27/031 (2006.01)
G11B 27/22 (2006.01)
G11B 27/30 (2006.01)
G11B 31/00 (2006.01)

(52) U.S. Cl.
CPC ............ G11B 27/06 (2013.01); G11B 27/002 (2013.01); G11B 27/005 (2013.01); G11B 27/031 (2013.01); G11B 27/22 (2013.01); G11B 27/3081 (2013.01); G11B 31/006 (2013.01)

(58) Field of Classification Search
CPC ..... G11B 27/06; G11B 27/002; G11B 27/005; G11B 27/031; G11B 27/22
See application file for complete search history.

(56) References Cited

U.S. PATENT DOCUMENTS

| 6,665,423 | B1 * | 12/2003 | Mehrotra | H04N 19/25 375/E7.087 |
| 8,407,575 | B1 * | 3/2013 | Goldman | G06F 17/30843 345/629 |
| 8,605,783 | B2 * | 12/2013 | El-Saban | H04N 21/21805 375/240.1 |
| 8,798,318 | B2 * | 8/2014 | Lavender | G06K 9/00771 382/103 |
| 9,286,938 | B1 * | 3/2016 | Tseytlin | G11B 27/02 |
| 9,578,279 | B1 * | 2/2017 | Mysore Vijaya Kumar | H04N 5/917 |
| 2002/0018637 | A1 * | 2/2002 | Saito | G11B 27/107 386/241 |
| 2002/0051077 | A1 * | 5/2002 | Liou | G11B 27/28 348/465 |
| 2003/0117428 | A1 * | 6/2003 | Li | G06F 17/30787 715/716 |
| 2004/0170321 | A1 * | 9/2004 | Gong | G06F 17/30802 382/173 |
| 2006/0165379 | A1 * | 7/2006 | Agnihotri | G06F 17/30787 386/231 |

(Continued)

Primary Examiner — Mishawn Hunter
(74) Attorney, Agent, or Firm — K&L Gates LLP

(57) ABSTRACT

Various examples are directed to systems and method for creating a summary video of user content comprising a plurality of frames of data. A summarization engine may identify from the user content a first region-of-interest and a second region-of-interest. The summarization engine may generate a first content clip that comprises the first region-of-interest and has a first time length. The summarization engine may receive a new input variable for the summary video. The summarization engine may determine a modified first time length of the first content clip and generate a modified first content clip having the first modified time length. The summarization engine may generate the summary video including the modified first content clip.

18 Claims, 14 Drawing Sheets

(56) References Cited

U.S. PATENT DOCUMENTS

| | | | | |
|---|---|---|---|---|
| 2006/0222337 | A1* | 10/2006 | Fujikawa | G06F 17/30843 386/241 |
| 2008/0298767 | A1* | 12/2008 | Jeong | G06F 17/30787 386/241 |
| 2008/0317434 | A1* | 12/2008 | Nonaka | H04N 5/775 386/248 |
| 2009/0022472 | A1* | 1/2009 | Bronstein | G06K 9/00751 386/278 |
| 2011/0208722 | A1* | 8/2011 | Hannuksela | G06F 17/3002 707/723 |
| 2011/0292244 | A1* | 12/2011 | Deever | H04N 9/87 348/231.2 |
| 2011/0292245 | A1* | 12/2011 | Deever | G11B 27/034 348/231.2 |
| 2011/0293018 | A1* | 12/2011 | Deever | G06F 17/30781 375/240.25 |
| 2012/0095817 | A1* | 4/2012 | Kamil | G06Q 30/02 705/14.4 |
| 2012/0281969 | A1* | 11/2012 | Jiang | G11B 27/11 386/278 |
| 2012/0308209 | A1* | 12/2012 | Zaletel | G11B 27/034 386/278 |
| 2013/0083153 | A1* | 4/2013 | Lindbergh | H04N 7/15 348/14.08 |
| 2014/0023348 | A1* | 1/2014 | O'Kelly | G11B 27/031 386/278 |
| 2014/0052281 | A1* | 2/2014 | Eronen | G06F 17/30017 700/94 |
| 2015/0104147 | A1* | 4/2015 | Kosaka | G06F 17/30784 386/239 |
| 2015/0208021 | A1* | 7/2015 | Cho | G11B 27/327 386/230 |
| 2015/0256808 | A1* | 9/2015 | MacMillan | H04N 21/233 348/43 |
| 2015/0279390 | A1* | 10/2015 | Mani | G06F 17/30719 704/235 |
| 2016/0007100 | A1* | 1/2016 | Lim | H04N 5/91 386/241 |
| 2016/0034786 | A1* | 2/2016 | Suri | G06K 9/6256 382/159 |
| 2016/0133297 | A1* | 5/2016 | Thornton | G11B 27/06 386/230 |
| 2016/0292511 | A1* | 10/2016 | Ayalasomayajula | G06K 9/00751 |

* cited by examiner

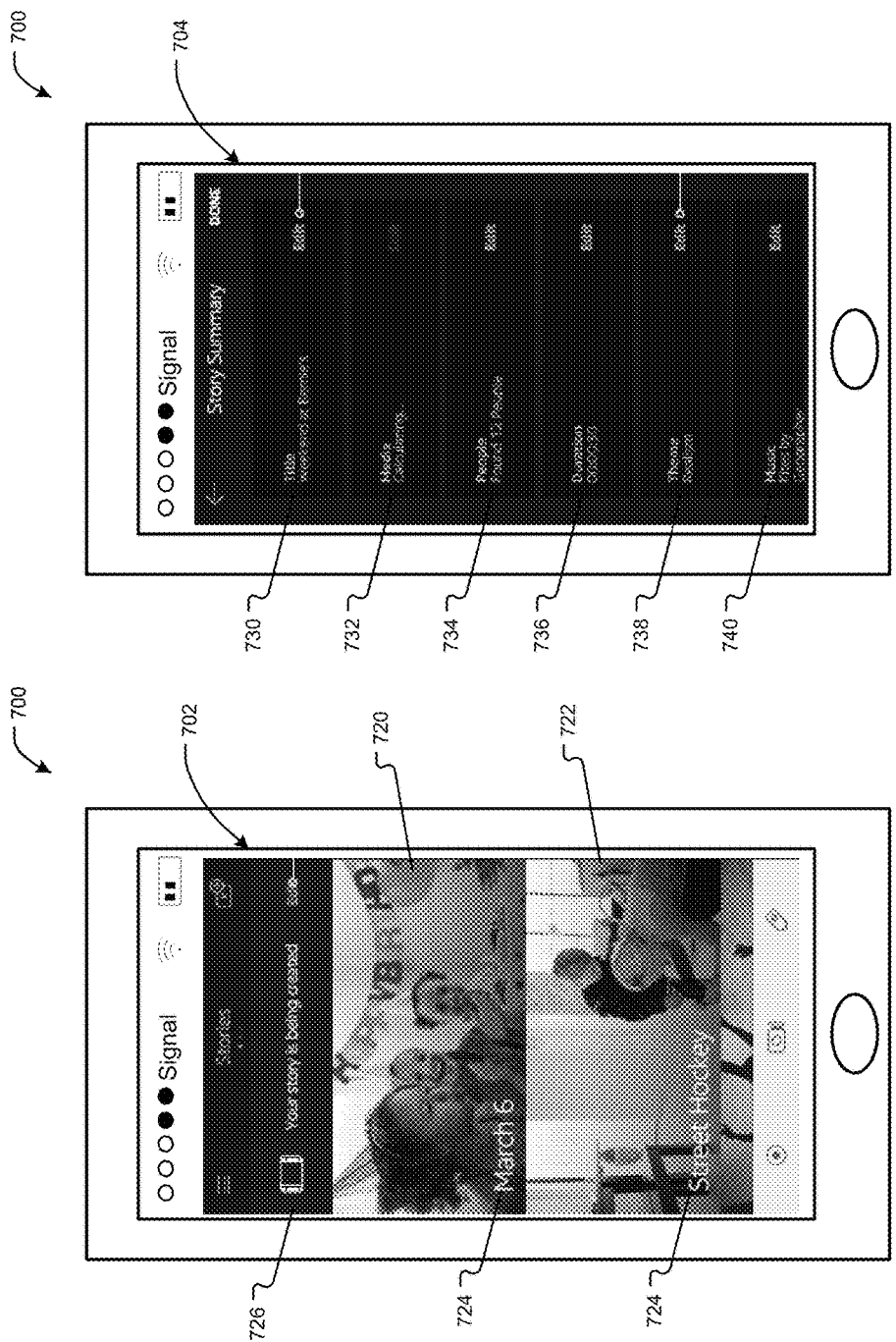

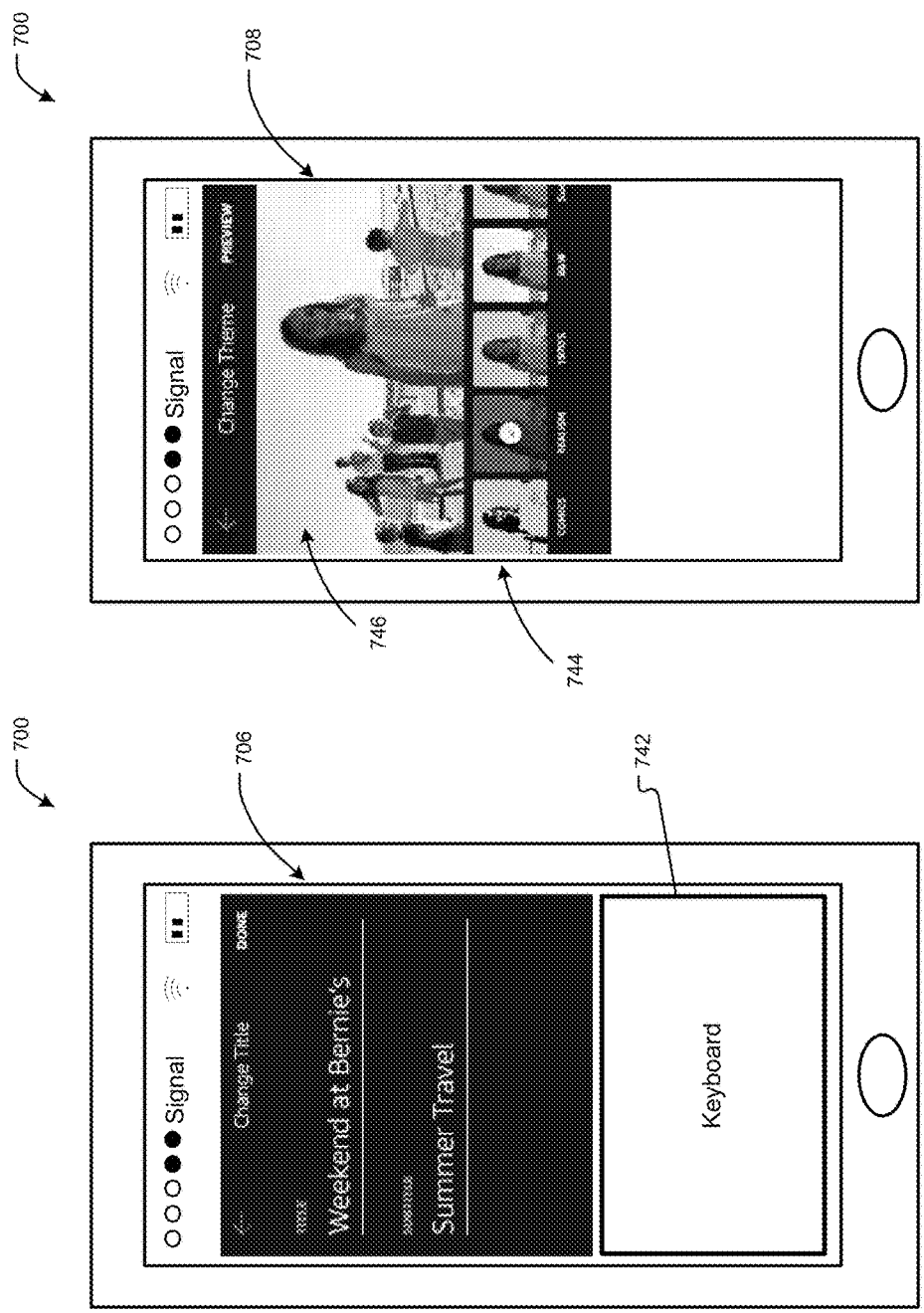

CONTENT SUMMARIZATION

BACKGROUND

The proliferation of digital cameras and smart phones has made it easier than ever for users to memorialize their lives with video and still image content. As users capture large libraries of content, however, identifying and viewing the content becomes a daunting task. For example, a user at a child's birthday party may capture an hour of video spread over several different video files. It is simply not practical for the user to regularly view the entire hour of videos and often difficult to find a particular scene or moment without scanning all or a large portion of the videos.

BRIEF DESCRIPTION OF DRAWINGS

FIGS. 12-15 are screen shots showing screens of an example user interface that may be provided to a user by the summarization app.

DETAILED DESCRIPTION

Figure 1:
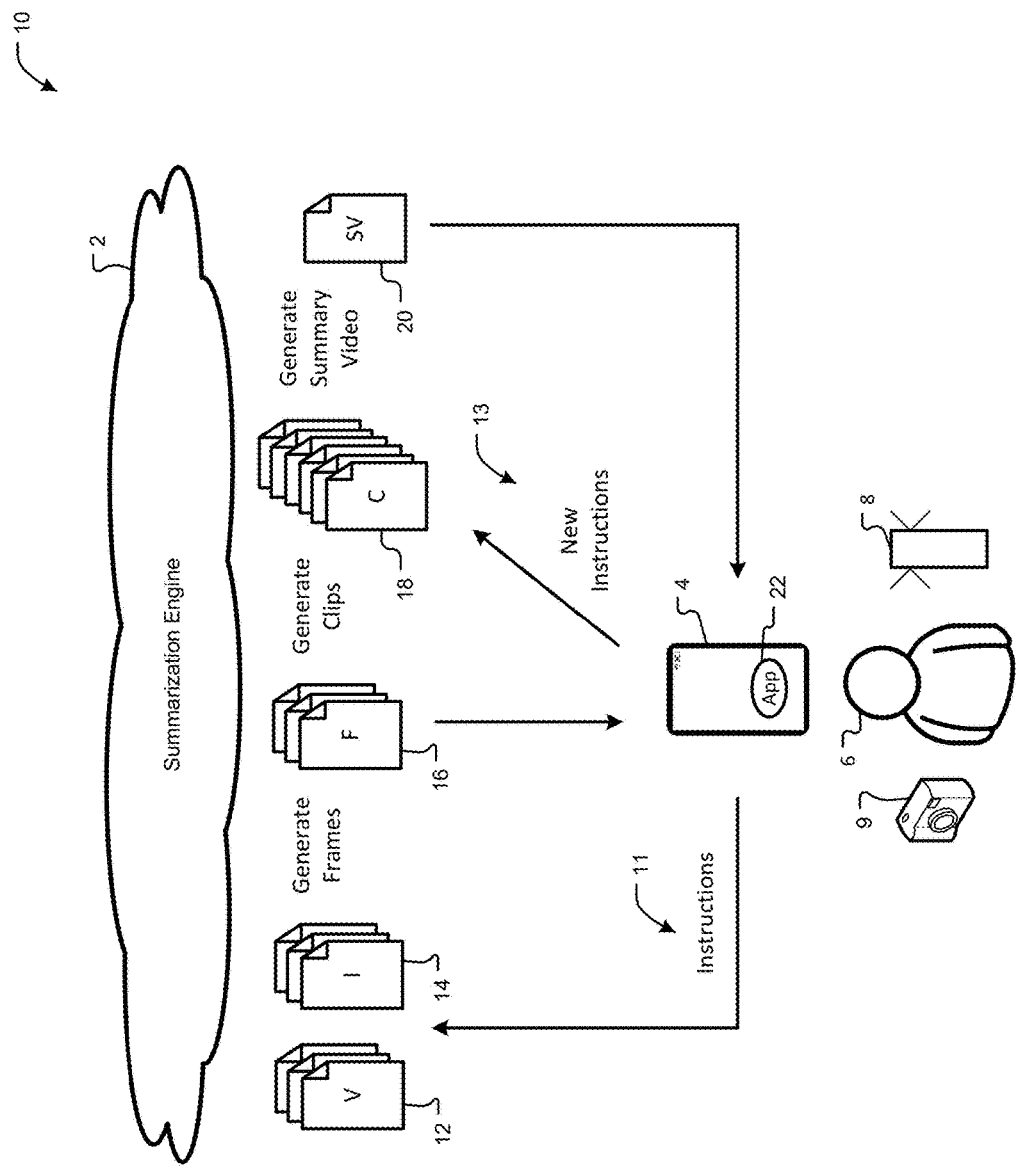
FIG. 1 is a diagram showing one example of a workflow for generating summary videos.

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for creating summary videos. Summary videos may be aggregations that include portions of other content including, for example, videos and/or images. A summarization engine may generate summary videos. For example, a user may capture content using any suitable camera such as, for example, a panoramic camera system, a mobile phone camera, any other type of digital camera, etc. A user device may receive an indication from a user to provide captured content to the summarization engine, which may modify and aggregate the content to generate the summary video. For example, the user may capture a number of videos and/or images at a child's birthday party. The user device may receive an indication from the user to provide the images and/or videos to the summarization engine, which may use them to generate a summary video including an aggregation of images and/or video clips from the birthday party. In some examples, summary videos may be created according to a theme. The content summarization engine may select various aspects of the summary video to be consistent with the theme. For example, a soundtrack for the summary video, a length and/or field-of-view of video clips making up the summary video, visual effects in the summary video, the coloring of videos and/or images included in the summary video, a tempo of the presentation of videos and/or images, etc., may be selected to be consistent with the theme, as described herein.

In various examples, the summarization engine may receive instructions from a user device before and/or during the creation of a summary video. An instruction may include one or more input variables describing how the summary video should be generated. Example input variables include a time length for the summary video, a theme for the summary video, a color filter for the summary video, a visual effect to be applied to content clips making up the summary video, etc. The user device may be, for example, a tablet or laptop computer device, a mobile phone, a camera system, etc. In some examples, the user device may receive from the user an identification of one or more people or other objects depicted in the content. Also, in some examples, the user device may receive from the user a theme and/or other properties of the summary video such as the overall length, the content (e.g., videos and/or images) to be included, etc. The summarization engine may receive instructions from the user device at various points as the summarization engine generates a summary video. In some examples, the summarization engine may receive user instructions after it has begun processing to create a summary video. For example, a user (via a user device) may want to change the theme, change the content to be aggregated, change the total length of summary video, etc. When the summarization engine receives new instructions after it has begun processing or even after the summary video is complete, it may have to redo some or all of the work necessary to create the summary video.

Various examples described herein utilize a summarization engine programmed to process content in a manner that minimizes the need to redo work if the user device provides a new instruction after creation of a summary video has begun. The summarization engine may receive content to be aggregated into a content summarization video. The content may include videos and/or images. The videos may be of any suitable length and the content (videos and/or images) may have any suitable field-of-view. In some examples, some or all of the content has a panoramic field of view.

After receiving content, the summarization engine may analyze the content to identify one or more regions-of-interest. Regions-of-interest are portions of a video and/or image that are candidates to be included in a summary video.

Regions-of-interest may include any objects, actions, or other things in an image and/or video. Examples regions-of-interest include, portions of an image or video that are tagged by a user (using a user device), portions of a video that show an object or scene over period of time (e.g., a time lapse), portions of an image or video that depict faces and/or whole people, portions of an image or video that depict objects, portions of an image or video that depict action. Regions of interest may be described by an area and/or a time. The area may indicate the part of a frame or frames (e.g., a set of pixels) where the region-of-interest appears. The time may indicate the time and/or set of frames where the region-of-interest appears. In some examples, the area of a region-of-interest may change from frame to frame. For example, if the region-of-interest is an object moving in a video.

After identifying regions-of-interest, the summarization engine may generate content clips. Content clips may show a portion of a frame or frames (e.g., a pixel area including set of pixels) including a region-of-interest. After creating the content clips, the summarization engine may modify and/or aggregate the content clips to create the summary video. Generating the summary video may include, for example, modifying a length of the content clips, modifying a color property of the content clips, adding a color or other visual effect to the content clips, applying a song or songs to the content clips, etc.

In some examples, creating summary videos as described herein may allow the summarization engine to respond efficiently to new instructions received from a user device. In some examples, when a user device provides the summarization engine with new instructions before content clips are formed into a summary video, the summarization engine may be configured to generate the summary video according to the new instructions with no increase or a minimal increase in required processing. The summarization engine may apply the new instructions in addition to or instead of older instructions when generating the summary video from the content clips. Also, in some examples, when a user device provides the summarization engine with new instructions after the summarization engine has begun to generate the summary video, additional processing time may be minimized. For example, the summarization engine may return to the content clips and generate a new video summary from the content clips according to the new instructions.

FIG. 1 is a diagram showing one example of a workflow 10 for generating summary videos. The workflow 10 shows a user 6 and a summarization engine 2. The user 6 may use a user device 4 and one or more cameras 8, 9. Cameras 8 and/or 9 may be used to capture content. For example, a digital camera 9 may be utilized to capture images and/or videos. Videos 12 and images 14 may comprise frames. A frame may comprise a grid of pixels showing a scene at a given time. Videos 12 may comprise a series of frames that may be displayed in succession. Each image 14 may comprise a single frame. Images 14 and videos 12, in some examples, may comprise frames representing a field-of-view of the camera 8, 9 that captured the image or video at a particular time. The digital camera 9 may have any suitable field-of-view. A panoramic camera 8 may be used to capture panoramic videos and/or images. A panoramic camera 8 may have a field-of-view larger than that of a standard camera. For example, a panoramic camera 8 may have a field-of-view of about 180° or greater. Some panoramic cameras 8 may have fields-of-view as large as $2\pi$ radians and/or $4\pi$ steradians. In the context of a camera or other image-capturing device, field-of-view describes the portion of a scene that is visible to the image-capturing device. For example, the field-of-view of an image-capturing device may be expressed as an angle or an angular range. Content captured with a panoramic camera or camera system may also be said to have a panoramic field of view. In the context of an image or video, field-of-view describes the portion of a scene that is reproduced in the image or video. Accordingly, the field-of-view of an image may be expressed as an area of or in the image. The field-of-view of a digital image or video, for example, may be expressed as a range of pixels. Panoramic cameras 8 may comprise a single image sensor with lenses, mirrors or other optics that project a panoramic field-of-view on the single image sensor. In some examples, panoramic cameras 8 comprise multiple image sensors. The panoramic camera 8 and/or other component may stitch the outputs from the multiple image sensors into a single panoramic image and/or video. In some examples, one or more of the cameras 8, 9 may be configured to provide captured content directly to the summarization engine 2, as described herein.

The user device 4 may be used to upload content to the summarization engine 2 and/or to provide the summarization engine 2 with instructions describing how to generate a summary video. The user device 4 may execute a content summarization app 22, for example, to implement the functionality described herein. The summarization app 22 may provide a user interface for receiving instructions from the user 6, displaying the status of a summary video to the user 6 and/or viewing summary videos upon completion. The app 22 may also comprise an interface for communicating with and providing instructions to the summarization engine 2. The summarization engine 2 may be implemented utilizing one or more servers remote from the user device 4. For example, the summarization engine 2 may be executed as a cloud service or Software as a Service (SaaS) application.

The user device 4 may receive an indication from the user 6 to capture content including, for example, one or more videos 12 and one or more images 14. The content 12, 14 may be provided to the summarization engine 2, either directly by the camera 8, 9 itself and/or through the user device 4. For example, the user 6 may connect a camera 8, 9 to the user device 4 to download captured content to the user device 4. After receiving captured content, the user device 4 may upload it to the summarization engine 2. The user device 4 (e.g., the app 22) may also provide the summarization engine 2 with instructions 11 for generating a summary video 20. The instructions 11 may indicate various parameters for creating the summary video 20 including, for example, the content to be summarized, the total length of the summary video 20, a theme for the summary video 20, etc.

Upon receiving the content 12, 14 and the instructions 11, the summarization engine 2 may, optionally, select one or more frames 16 from the videos 12 and/or the images 14. The frames 16 may be provided to the user device 4 (e.g., the app 22). The app 22 may utilize the received frames in any suitable manner. For example, the app 22 may incorporate one or more of the frames 16 into a user interface to represent the summary video 20 to the user 6 while the video 20 is being created (See FIGS. 12-18). The summarization engine 2 may also generate content clips 18. For example, the summarization engine 2 may identify regions-of-interest in the content 12, 14, as described herein. The identified regions-of-interest may be described by an area, such as a set of pixels in a frame or frames. If the region-of-interest is identified in a video, it may also be described by a time, e.g., indicated by a frame or set of frames from the video where the region-of-interest is depicted. The area may be in the same position in each frame or may be in different positions, as described herein. Content clips 18 may include the identified regions-of-interest. Content clips 18 may be generated by selecting portions of a video 12 or image 14 that are temporally and/or spatially around an identified region-of-interest. In the context of a video 12, for example, the summarization engine 2 may generate a content clip 18 by taking a threshold number of frames before the appearance of a region-of-interest and a threshold number of frames after the disappearance of the region-of-interest. In some examples, the summarization engine may also crop the frames of a video 12 to include the pixel area (e.g., pixels) depicting the region-of-interest. The pixel area may include a set of pixels that show the region-of-interest (e.g., an object, an action, etc.) In some examples, the pixel area for a region-of-interest may change in size and/or position from frame-to-frame, for example, as shown herein with respect to FIG. 10B. In some examples, when the pixel area of a region-of-interest is in different positions across the different frames of the region-of-interest, the content clip may be cropped to a size large enough to encompass all of the positions of the pixel area in the frames and/or the content clip 18 may pan to follow the pixel area from frame to frame. A content clip 18 taken from an image 14 may comprise the all or a portion of the pixels from the image that include a region-of-interest.

The summarization engine 2 may generate the summary video 20 from the clips 18. Generating the summary video 20 may comprise various actions. For example, the summarization engine 2 may select clips 18 to be included in the summary video 20, modify the length of clips 18 to be included in the summary video 20, change a color or other setting of the clips 18 to be included in the summary video 20, select music or another soundtrack for the summary video 20, select background imagery for the summary video, etc. The summarization engine 2 may join the selected and modified content clips 18 to form the summary video. Joining may include, for example, forming a single summary video 20 comprising the modified content clips 18 to be played one after another.

In some examples, the user device 4 may send new instructions 13 after the original instructions 11. The new instructions 13 may include additional instructions that were not included in the instructions 11 and/or changes to the instructions 11. New instructions 13 may be provided at any point during or after the summarization engine 2 creates the summary video 20. Examples of new instructions 13 include a total length of the summary video 20, a theme for the summary video 20, etc. In some examples, the workflow 10 may be configured to allow implementation of the new instructions 13 with no or with minimal increase in processing time when the new instructions 13 are received before the summary video 20 is generated from the content clips 18. For example, in response to a new instruction 13 to change a theme of the summary video 20, the summarization engine 2 may change the length of clips 18 included in the summary video 20, include different clips 18 in the summary video, select different music for the summary video 20, etc. Also, for example, in response to a new instruction 13 changing the requested length of the summary video 20, the summarization engine 2 may change the number and/or length of clips 18 included in the summary video 20.

Figure 2:
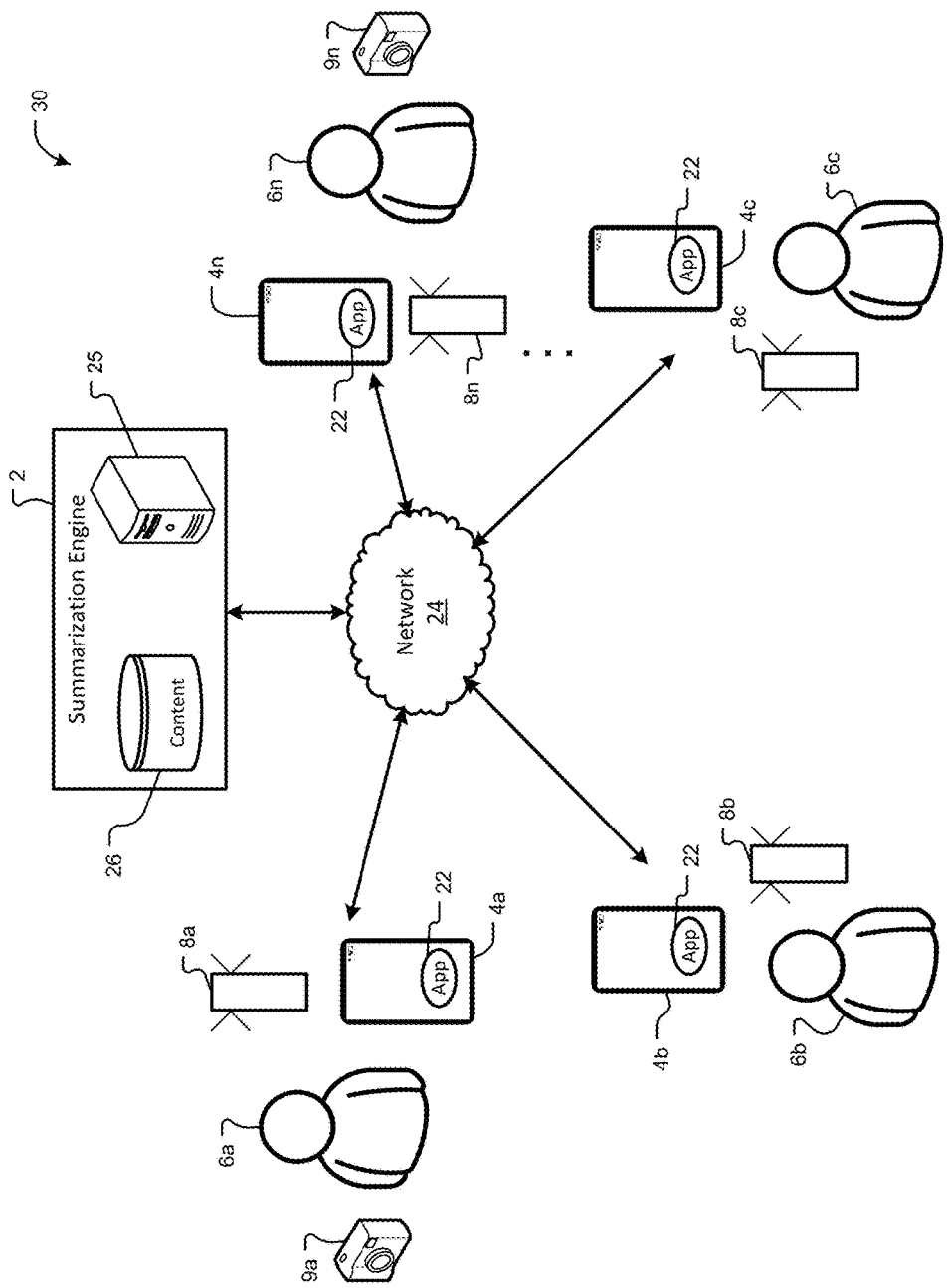
FIG. 2 is a diagram showing one example of an environment for generating summary videos.

FIG. 2 is a diagram showing one example of an environment 30 for generating summary videos. The environment may comprise the summarization engine 2 and users 6a, 6b, 6c, 6n. Users 6a, 6b, 6c, 6n may utilize various devices including panoramic cameras 8a, 8b, 8c, 8n, digital cameras 9a, 9n, and user devices 4a, 4b, 4c, 4n. The user devices 4a, 4b, 4c, 4n may execute the app 22 described herein. The summarization engine 2 may comprise one or more data stores 26 and one or more servers 25. The data store 26 may store videos and/or images received from the various cameras 8a, 8b, 8c, 8n, 9a, 9n and/or user devices 4a, 4b, 4c, 4n. The data store 26 may also store summary videos generated by the summarization engine 2. The various components 24, 26 of the summarization engine 2 may be at a common geographic location and/or may be distributed across multiple geographic locations. For example, the summarization engine 2 may be implemented in whole or in part as a cloud system. The various components of the environment 30 may be in communication with one another via a network 24. The network 24 may be and/or comprise any suitable wired or wireless network configured according to any suitable architecture or protocol. In some examples, the network 24 may comprise the Internet.

The various cameras 8a, 8b, 8c, 8n, 9a, 9n may capture images and/or videos as described herein (e.g., under the direction of a user 6a, 6b, 6c, 6n). The content (e.g., images and/or videos) may be provided to the summarization engine 2 directly from the camera 8a, 8b, 8c, 8n and/or via a user device 4a, 4b, 4c, 4n. For example, the user 6a, 6b, 6c, 6n may download content from the camera 8a, 8b, 8c, 8n, 9a, 9n to a user device 4a, 4b, 4c, 4n. The user device 4a, 4b, 4c, 4n may then upload the content to the summarization engine 2, for example, using the network 24. Although a specific number of users 6a, 6b, 6c, 6n, cameras 8a, 8b, 8c, 8n, 9a, 9n, user devices 4a, 4b, 4c, 4n, summarization engines 2, etc. are shown in FIG. 2, any suitable number of these and other components may be included in the environment 30.

Figure 3:
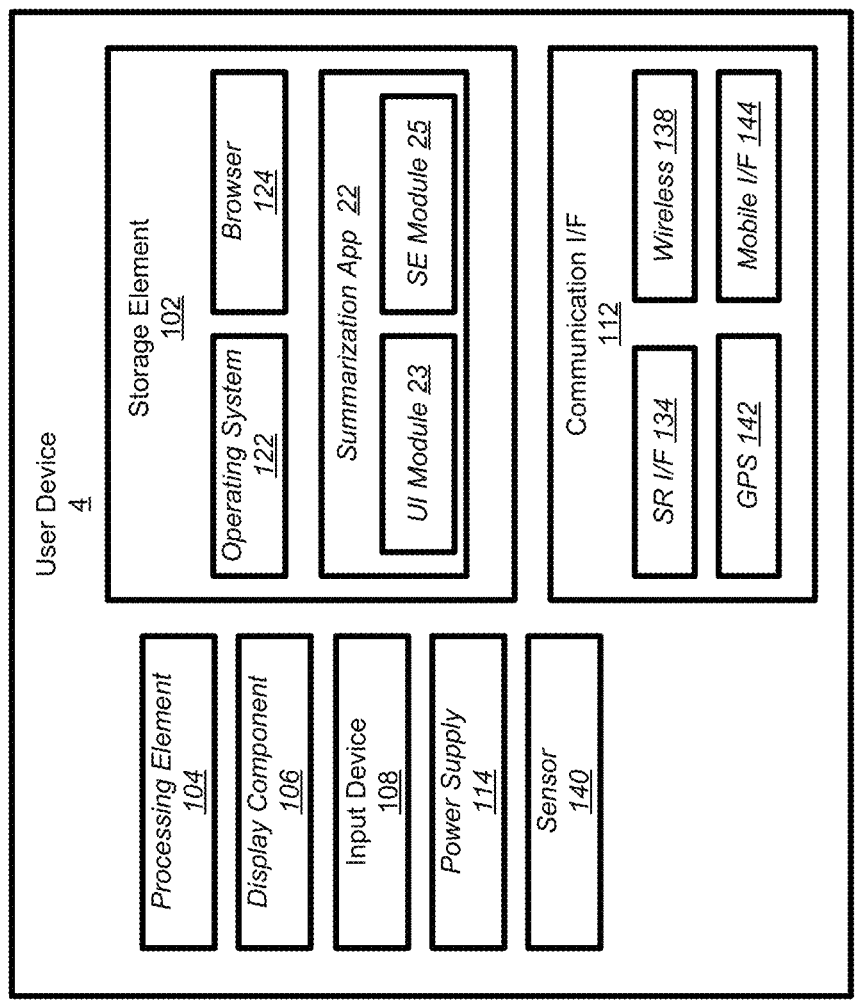
FIG. 3 is a block diagram showing additional details of an example user device.

FIG. 3 is a block diagram showing additional details of an example user device 4. The example user device 4 may represent one or more of the user devices 4a, 4b, 4c, 4n described herein. In some examples, the user device 4 may include a display component 106. The display component 106 may comprise, for example, one or more devices such as cathode ray tubes (CRTs), liquid crystal display (LCD) screens, gas plasma-based flat panel displays, LCD projectors, or other types of display devices, etc. The user device 4 may also include one or more processing elements 104 for executing instructions and retrieving data stored in a storage element 102. The storage element 102 can include one or more different types of memory, data storage or computer readable storage media devoted to different purposes within the user device 4. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104, such as an operating system 122. The summarization app 22, described herein, may be stored at the storage element 102. In some examples, the summarization app 22 may comprise a user interface or UI module 23 and a summarization engine interface or SE module 27. The UI module 23 may provide a user interface for providing content to and receiving instructions from the user. Examples of a UI that may be provided by the UI module are described herein with respect to FIGS. 12-15. The SE module 27 may interface with the summarization engine 2 described herein to provide content and instructions to the summarization engine 2 and receive summary videos from the summarization engine 2. In some examples, the storage element 102 may also comprise a browser program 124 for execution by the processing element 104. The browser program 124 may work independent of or in conjunction with the summarization app 22 to request summary videos, as described herein. In some examples, the summarization app 22 may be a web app accessed by the users 6a, 6b, 6c, 6n through the browser program 124. For example, a user 6a, 6b, 6c, 6n may (through the browser program 124) access a web site or other network location provided by the summarization engine 2 to download and/or execute the summarization app 22.

The user device 4 may also include one or more input devices 108 operable to receive inputs from a user. The input devices 108 can include, for example, a push button, touch pad, touch screen, wheel, joystick, keyboard, mouse, trackball, keypad, accelerometer, light gun, game controller, or any other such device or element whereby a user can provide inputs to the user device 4. These input devices 108 may be incorporated into the user device 4 or operably coupled to the user device 4 via wired or wireless interface. For user devices 4 with touch sensitive displays, the input devices 108 can include a touch sensor that operates in conjunction with the display component 106 to permit users to interact with the image displayed by the display component 106 using touch inputs (e.g., with a finger or stylus). The user device 4 may also include a power supply 114, such as a wired alternating current (AC) converter, a rechargeable battery operable to be recharged through conventional plug-in approaches, or through other approaches such as capacitive or inductive charging. In some examples, the input devices 108 may comprise a camera or other optical sensor.

The user device 4 may also include a communication interface 112, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. Examples of wireless components in the communications interface 112 include, for example, a wireless module 138 configured to communicate utilizing IEEE 802.11 or another suitable wireless local area network (LAN) protocol. A mobile interface 144 may be configured to communicate utilizing a cellular or other mobile protocol. A short range interface 134 may be configured to communicate using one or more short range wireless protocols such as, for example, near field communications (NFC), Bluetooth™, Bluetooth LE™, etc. A Global Positioning System (GPS) module 142 may be in communication with one or more earth-orbiting satellites or other suitable position-determining systems to identify a position of the user device 4. It should be understood that the user device 4 may also include one or more wired communications interfaces for coupling and communicating with other devices.

In some examples, one or more of the communication interfaces 112 may be configured to communicate with a camera 8, 9 either at the request of a user 6a, 6b, 6c, 6n and/or automatically. For example, when the user 6a, 6b, 6c, 6n makes a wired connection between the camera 8, 9 and the user device 4 and/or brings a camera 8, 9 within range of the wireless interface 138 and/or short range interface 134, the camera 8, 9 and user device 4 may be configured to upload content from the camera 8, 9 to the user device 4. In some examples, the user device 4 may be programmed to subsequently upload the content to the summarization engine 2. In some examples, a camera 8, 9 may comprise a control circuit comprising some or all of the elements of the user device 4 illustrated in FIG. 3. For example, the camera 8, 9 may be configured to directly provide content to the summarization engine 2, instruct the summarization engine 2 to generate a summary video, and/or receive a summary video from the summarization engine 2.

The user device 4 may additionally comprise one or more sensors 140. For example, a gyro sensor may be configured to generate a signal indicating rotational motion and/or changes in orientation of the user device 4 (e.g., a magnitude and/or direction of the motion or change in orientation). Any suitable gyro sensor may be used including, for example, ring laser gyros, fiber-optic gyros, fluid gyros, vibration gyros, etc. An accelerometer may generate a signal indicating an acceleration (e.g., a magnitude and/or direction of acceleration). Any suitable accelerometer may be used including, for example, a piezoresistive accelerometer, a capacitive accelerometer, etc.

Figure 4:
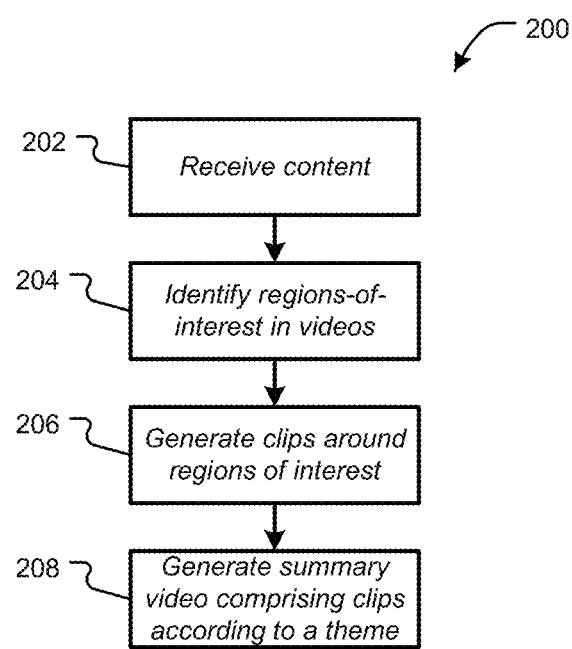
FIG. 4 is a flowchart showing one example of a process flow that may be executed by the summarization engine to create summary videos.

FIG. 4 is a flowchart showing one example of a process flow 200 that may be executed by the summarization engine 2 to create summary videos. At 202, the summarization engine 2 may receive content. Referring also to FIG. 1, the received content may include videos 12 and/or images 14. Content may be received directly from a camera 8,9 and/or from a user device 4a, 4b, 4c, 4n (e.g., a user device executing the summarization app 22). At 204, the summarization engine 2 may identify regions-of-interest in the received content. Regions-of-interest may be identified in any suitable manner including, for example, as described herein in more detail with respect to FIG. 7. As described herein, each identified region-of-interest may be described by a pixel area (e.g., a set of pixels). Regions-of-interest identified in videos may also be described by a time during which the region-of-interest appears, which may be expressed as a set of frames. As described herein, the pixel area may change size and position from frame to frame. At 206, the summarization engine 2 may generate content clips 18 around some or all of the regions-of-interest identified at 204. Generating the content clips may comprise, for example, cutting from the images 14 and/or videos 12 spatial and/or temporal portions around regions-of-interest. For example, if a region-of-interest is a person appearing in a particular area of a video over a particular range of frames, the summarization engine 2 may crop the range of frames around the pixel area or areas including the person, storing the result as a content clip 18. Additional examples for generating content clips 18 around regions-of-interest are described herein with respect to FIGS. 8-10. At 208, the summarization engine 2 may generate a summary video 20 from the content clips 18, for example, as described herein.

Figure 5:
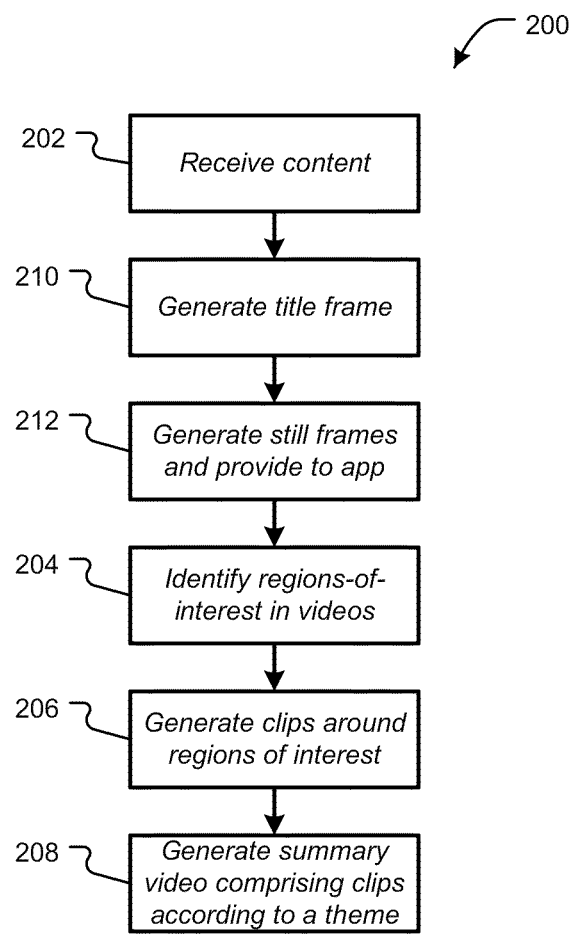
FIG. 5 is a flowchart showing another example process flow that may be executed by the summarization engine to create summary videos.

FIG. 5 is a flowchart showing another example process flow 200' that may be executed by the summarization engine 2 to create summary videos. The process flow 200' may be similar to the process flow 200 described above and may include two additional actions 210, 212. After receiving some or all of the content at 202, the summation engine 2 may generate a title frame. The title frame may be all or part of a frame selected from the content and may be used to identify the summary video 20 in a user interface provided to the user 6a, 6b, 6c, 6n, for example, via the summarization app 22. For example, the title frame may be displayed to the user 6a, 6b, 6c, 6n as all or part of an icon or in conjunction with a screen that shows the user 6a, 6b, 6c, 6n the status of the creation of the summary video 20, provides the user with an interface for providing new instructions to the summarization engine 2 in conjunction with the summary video 20, etc. At 212, the summarization engine 2 may generate still frames and provide the still frames to the summarization app 22. Each still frame may comprise all or a portion of a frame from the content. The summarization app 22 may use the still frames in any suitable manner. For example, the summarization app 22 may provide the user 6a, 6b, 6c, 6n with an option to select one of the still frames as a new title frame and/or may allow the user 6a, 6b, 6c, 6n to scan the still frames (e.g., during or after generation of the summary video 20), etc. Although actions 210 and 212 are illustrated as being executed after the summarization engine 2 receives content at 202 and identifies regions-of-interest at 204, actions 210 and 212 may be performed at any time. Also, in some examples, actions 210, 212 may be performed by the summarization app 22 (e.g., before, during, or after the content is uploaded to the summarization engine 2).

Figure 6:
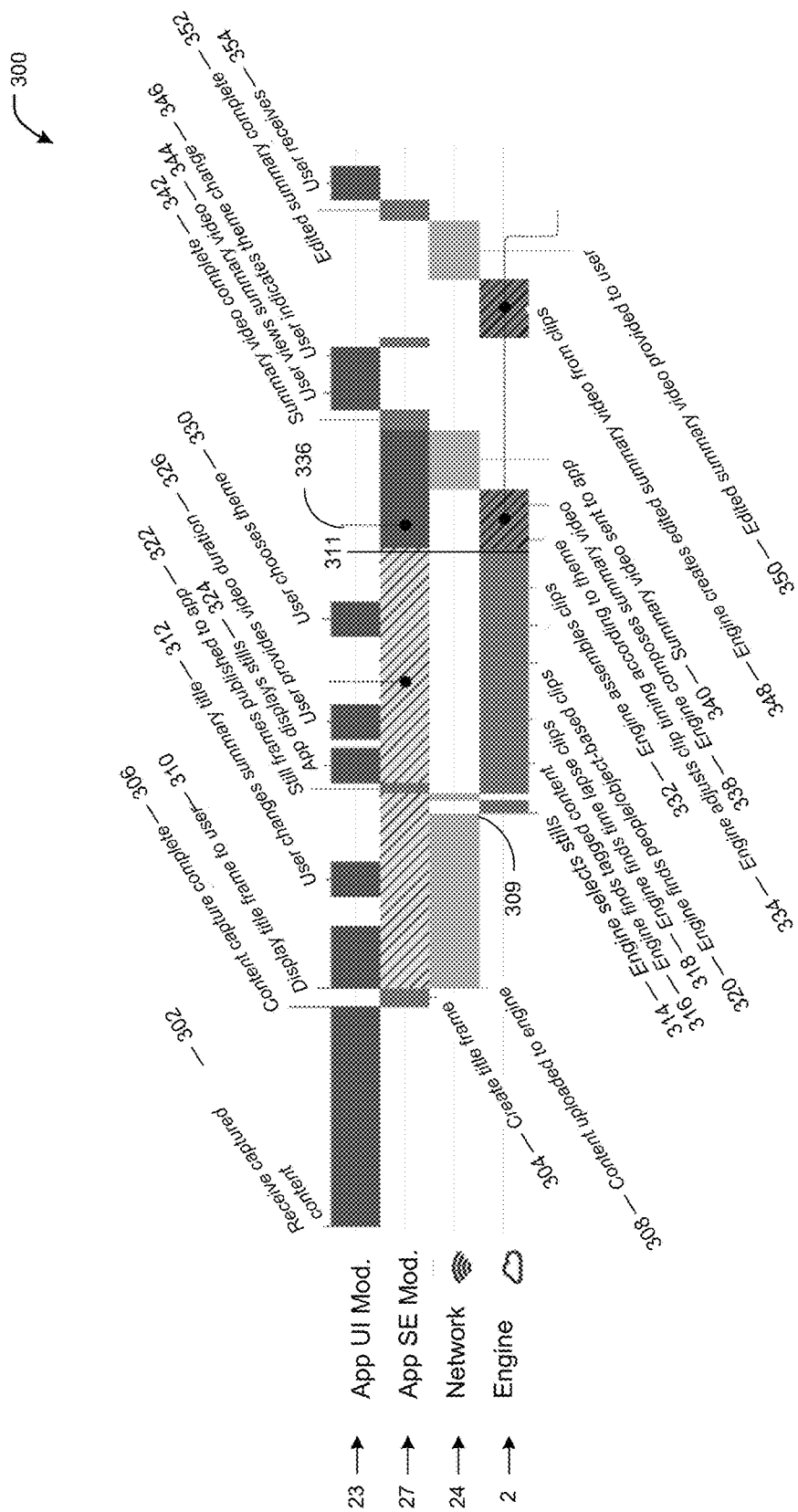
FIG. 6 is a timeline showing one example interaction between a user, an instance of the summarization app, the network, and the summarization engine (e.g., as illustrated in FIG. 2).

FIG. 6 is a timeline 300 showing one example interaction between the UI module 23 of the summarization app 22, the summarization engine module 23 of the summarization app 22, the network 24, and the summarization engine 2. The modules 23, 25 may be executed by a user device 4 and/or a camera 8, 9 in use by a user, such as any of the users 6a, 6b, 6c, 6n described herein. At 302, the UI module 23 may receive captured content. The content may be captured by the device 4, 8, 9 executing the UI module 23 and/or may be received from the capturing device. The content may include videos and/or images, as described herein. After capture, the content may be stored at a storage element (e.g., storage element 102) of the user device 4a, 4b, 4c, 4n or other device executing the summarization app 22. Content capture may complete at 306. At 304, the SE module 27 may generate a title frame. In some examples, as shown in FIG. 5 above, the title frame may alternatively be selected by the summarization engine 2 after some or all of the content is uploaded to the summarization engine 2. The title frame may be displayed to the user 6 at 310. At 308, the SE module 27 may begin to upload the captured content to the summarization engine 2. In some examples, the upload may be accompanied by instructions for generating a summary video (e.g., instructions 11 described herein). When the content is uploaded to the summarization engine 2, the summarization engine 2 may select still frames at 314 (for example, as described herein above at 212). The still frames may be published to the summarization app (e.g., the SE module 27) at 322. The summarization app 22 may display the still frames to the user at 324 (e.g., via the UI module 23).

Between 316 and 328, the summarization engine 2 may identify regions-of-interest in the uploaded content. In the example of FIG. 6, tagged content is found at 316. For example, as described herein, the user 6 may tag regions-of-interest within content before it is uploaded to the summarization engine 2. Each tag may indicate a pixel area (e.g., set of pixels) including a region-of-interest. When the tag relates to a video it may also indicate a range of time (e.g., set of frames, such as a set of consecutive frames) including the region-of-interest. At 318, the summarization engine 2 may identify time-lapse regions-of-interest. At 320, the summarization engine 2 may identify object-based regions-of-interest (e.g., regions-of-interest depicting, people, places, or other objects). Additional details describing the identification of regions-of-interest are provided herein with respect to FIG. 7. At 332, the summarization engine 2 may assemble the created content clips. Additional details describing the creation of content clips are provided herein,
for example, with respect to FIGS. 8-10. Assembling the content clips may comprise selecting and ordering clips to be completely or partially included in the summary video. The summarization engine 2 may adjust clip timing according to a theme at 334 and compose the summary video at 340. At the area indicated by 336 (e.g., after clip timing has been adjusted at 334) the user 6 (via the user device 4) may no longer be able to modify the creation of the summary video without reprocessing. At 338, the summarization engine 2 may create the summary video. Additional details describing how the summarization engine creates summary videos are provided herein with respect to FIG. 11.

From the time that the uploading of content begins at 308 to the time that the summarization engine 2 begins to modify the content clips at 334, the summarization engine 2 may be able to receive new instructions with little to no impact on the total processing time for generating a summary video. For example, at 312, the UI module 23 may receive from the user a request to change the name of the summary video. At 326, the UI module 23 may receive from the user an indication of a total duration of the summary video. At 330, the UI module 23 may receive from the user a theme for the summary video. The instructions from 312, 326 and 330 may be provided to the summarization engine 2, for example, via the summarization app 22 and network 24. The instructions from 312, 326, and 330 may replace instructions provided to the summarization engine 2 earlier in the timeline 300 and/or may be instructions not previously provided to the summarization engine 2.

After the summarization engine 2 creates the summary video, it may be sent to the summarization app 22 (e.g., the SE module 27) at 340. The SE module 27 may complete its download of the summary video from the summarization engine at 342. The UI module 23 may display the summary video to the user at 344. In the example illustrated by the timeline 300, the user 6 may determine after viewing the summary video that the user would prefer a different theme. Accordingly, the user device 4 may receive from the user 6 an indication to request a theme change at 346. The request may be passed through the summarization app 22 to the summarization engine 2. At 348, the summarization engine 2 may create an edited summary video from the content clips that were previously created. For example, it may not be necessary for the summarization engine 2 to re-identify regions-of-interest in the received content and/or generate new stills. In some examples, the summarization engine 2 may need to re-assemble clips according to the newly changed theme. The edited summary video may be downloaded to the summarization engine 2 at 350. When the download is complete (352), the user may view the edited summary video at 354.

Figure 7:
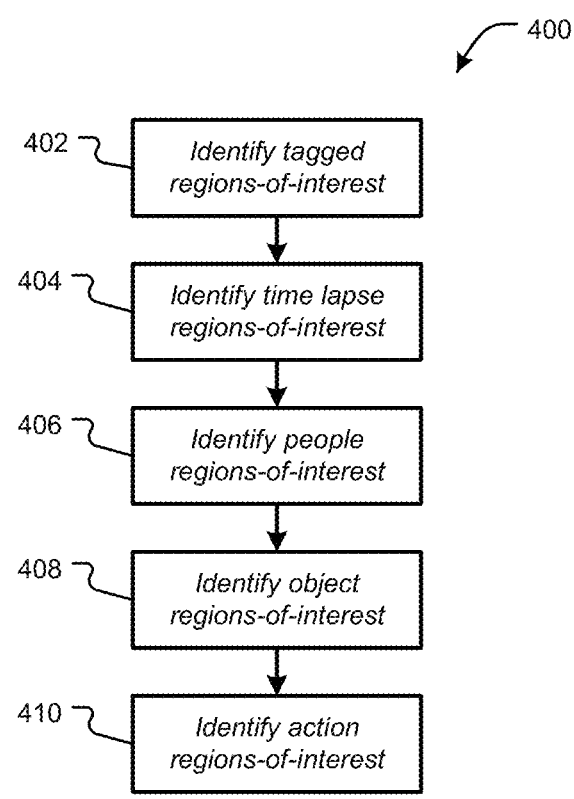
FIG. 7 is a flowchart showing one example of a process flow that may be executed by the summarization engine to identify regions-of-interest in content (e.g., video and/or images).

FIG. 7 is a flowchart showing one example of a process flow 400 that may be executed by the summarization engine to identify regions-of-interest in content (e.g., video and/or images). At 402, the summarization engine 2 may identify tagged regions-of-interest. Tagged regions-of-interest may be portions of the content that include a tag or indication that the portions include a region-of-interest. The tag may be affixed in any suitable manner. For example, the tag may be appended to a video and may include a pointer to an area (e.g., set of pixels) and/or time (e.g., set of frames) including the region-of-interest. In some examples, a user may view the content before it is uploaded to the summarization engine 2 and may affix the tags. Also, in some examples, the camera 8, 9 used to capture the content may comprise a button or other input device that may be selected by a user to indicate that video or images captured at the current time includes a region of interest.

At 404, the summarization engine 2 may identify time lapse regions-of-interest. Time lapse regions-of-interest may show a common scene and be captured over a long period of time. The summarization engine 2, for example, may identify consecutive frames from videos that show the same scene. Frames showing the same scene may be identified in any suitable manner.

At 406, the summarization engine 2 may identify people regions-of-interest. People regions-of-interest may be people depicted in received videos and/or images. The summarization engine 2 may identify people regions-of-interest utilizing any suitable object recognition algorithm. Example object-recognition algorithms may identify faces, people walking, etc. In some examples, after identifying people regions-of-interest, the summarization engine 2 may provide still images and/or clips showing some or all of the people regions-of-interest to the user device 4, which may display them to the user 6 (e.g., via the summarization app 22). The user device 4 may receive from the user 6 indications identifying some or all of the people. For example, the user device 3 may receive identifying indications through the interface provided by the summarization app 22. The summarization app 22 may provide the indicated identities to the summarization engine 2, which may utilize the identities to create the summary video.

At 408, the summarization engine 2 may identify object regions-of-interest. Object regions-of-interest may be portions of content that depict an object. Objects may be identified using any suitable object recognition algorithm. Example objects include, cars, houses, skylines, etc. In some examples, the summarization engine 2 may provide still images and/or clips of the identified objects to the user device 4, as described. The user device 4 may receive from the user 6 indications identifying object or objects. At 410, the summarization engine 2 may identify action regions-of-interest. Action regions-of-interest may be portions of a video where objects are moving. Any suitable object or motion recognition algorithm may be used to identify motion in one or more frames.

Figure 8:
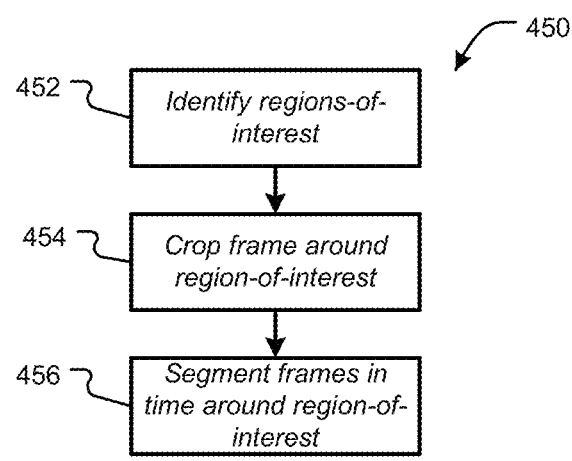
FIG. 8 is a flowchart showing one example of a process flow that may be executed by the summarization engine to create content clips from regions-of-interest.

FIG. 8 is a flowchart showing one example of a process flow 450 that may be executed by the summarization engine 2 to create content clips from regions-of-interest. At 452, the summarization engine 2 may identify regions-of-interest, for example, as described herein. As described herein, the region-of-interest may be described by an area, such as a set of pixels. If the content is a video, the region-of-interest may also be described by a time, such as a set of frames or a playback time range in the video. At 454, the summarization engine 2 may crop frames including the region-of-interest around the region-of-interest, generating cropped frames. In some examples, a cropped frame may include a set of pixels including the region-of-interest. In some examples, a cropped frame may include the set of pixels including the pixel area of the region-of-interest plus a threshold number of buffer pixels in each direction around the pixel area. In some examples, the threshold may be different in different directions. For example, the threshold may include X pixels to either horizontal side of the pixel area and Y pixels to either vertical side of the pixel area. In some examples, the cropped frame may include a set of pixels that includes the region-of-interest plus additional buffer pixels such that the cropped frame corresponds to a predetermined aspect ratio (e.g., 4:3, 16:9, etc.) In some examples, the region-of-interest may be centered in the cropped frame. Also, in some examples, where the pixel area of a region-of-interest is in different positions from frame to frame, the summarization engine 2 may crop different frames of the content clip around the different positions of the pixel area. In some examples, the summarization engine may crop in a manner that keeps all positions of the pixel area within the content clip.

At 456, the summarization engine 2 may segment videos in time around a region-of-interest. For example, 456 may be omitted when a region-of-interest is identified in a still image (e.g., an image having a single frame). Segmenting a video may comprise identifying a set of frames comprising the region-of-interest. Cropped frames for each region-of-interest may be selected and formed into a content clip. In some examples, the summarization engine 2 may include additional buffer frames before and after the region-of-interest (e.g., a threshold number of frames before and a threshold number of frames after). The threshold number of frames may include any suitable number of frames including, for example, an integer such as 60 or a number of frames corresponding to an amount of playback time (e.g., 5 seconds, 10 seconds, etc.). In some examples, buffer frames may be cropped in a manner similar to that in which the frames including the region-of-interest were cropped at 454. When a region-of-interest appears in a still image, a content clip including the region-of-interest may comprise an area of pixels that is to be displayed as a still image for a given play length or length. The length may be set and/or modified by the summarization engine, for example, as the lengths of other content clips are modified in the manner described herein.

Figure 9:
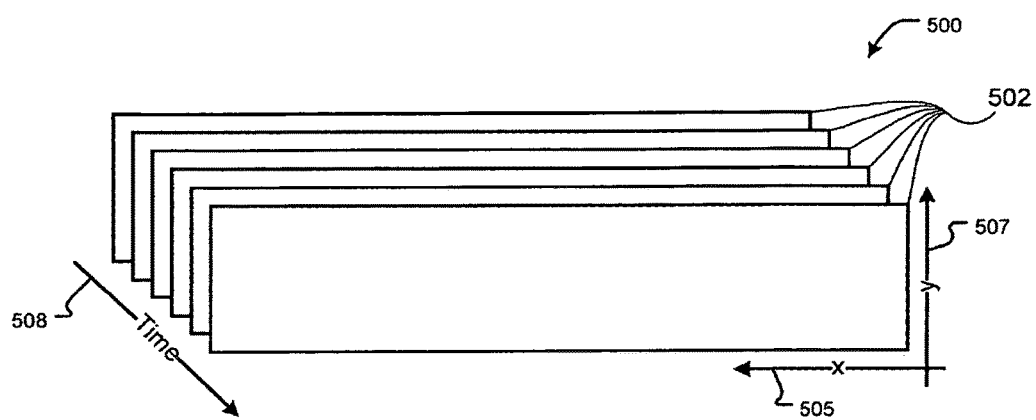
FIG. 9 is a diagram showing a representation of a portion of a video content item or video to demonstrate how regions-of-interest and content clips may be generated.

FIG. 9 is a diagram showing a representation of a portion of a video content item or video 500 to demonstrate how regions-of-interest and content clips may be generated. The video 500 comprises a plurality of frames 502. Each frame 502, for example, may have been captured at a given time by an image sensor or sensors of a camera (e.g., cameras 8, 9 described herein). The frames 502 may be ordered in time 508 as illustrated. Although six frames are shown, a video may have any suitable number of frames depending on its length and frame rate (e.g., the rate at which frames are displayed during playback). Each frame may have a plurality of pixels arranged in a grid indicated by the x-axis 505 and y-axis 507.

Figure 10A:
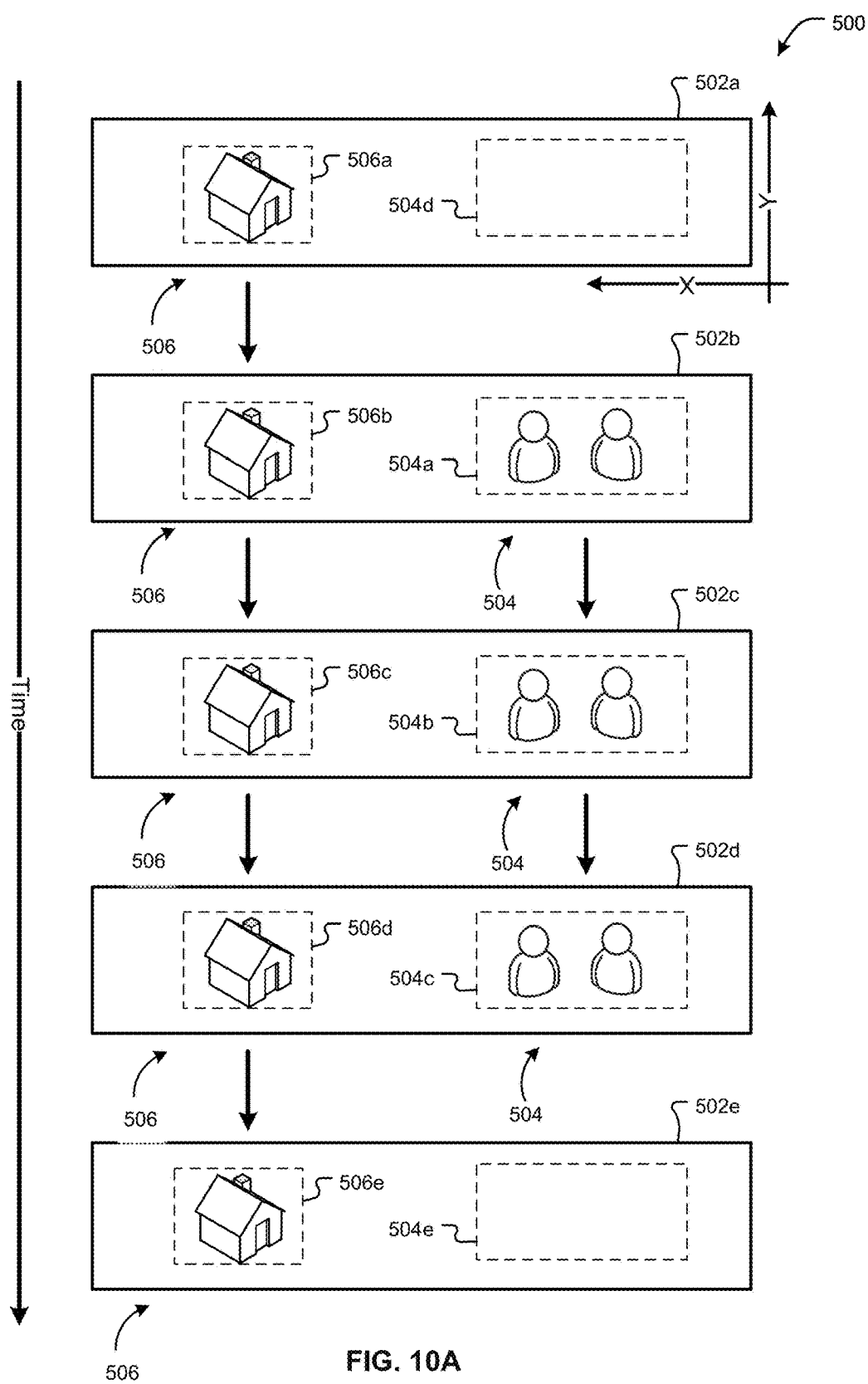
FIG. 10A is a diagram showing frames of a video including regions-of-interest.

FIG. 10A is a diagram showing frames 502*a*-502*e* of the video 500 including regions-of-interest 504, 506. The region-of-interest 504 appears in three frames 502*b*, 502*c*, 502*d*. To generate a content clip including the region-of-interest 504, the summarization engine 2 may crop frames 502*b*, 502*c* and 502*d* down to regions 504*a*, 504*b*, 504*c*. In some examples, the summarization engine may also crop similar regions from a threshold number of frames 502 before frame 502*b* and after 502*d*, as described herein. For example, regions 504*d* and 504*e* may be part of the content clip including the pixel area of the region-of-interest 504. (The pixel area of the region-of-interest 504 may include the pixels showing the figures of the two people). Accordingly, an example content clip including the region-of-interest may include regions 504*d*, 504*a*, 504*b*, 504*c*, and 504*e* arranged to be displayed in that order. Another example region-of-interest 506 is shown in another portion of the frames 502*a*, 502*b*, 502*c*, 502*d*, 502*e*. For example, the summarization engine 2 may crop the frames 502*a*, 502*b*, 502*c*, 502*d*, 502*e* around boxes 506*a*, 506*b*, 506*c*, 506*d*, 506*e*. A content clip including the region-of-interest 506 may include similar pixel areas in a threshold number of frames before 502*a* and a threshold number of frames after 506*e*, although these are not shown in FIG. 10A.

Figure 10B:
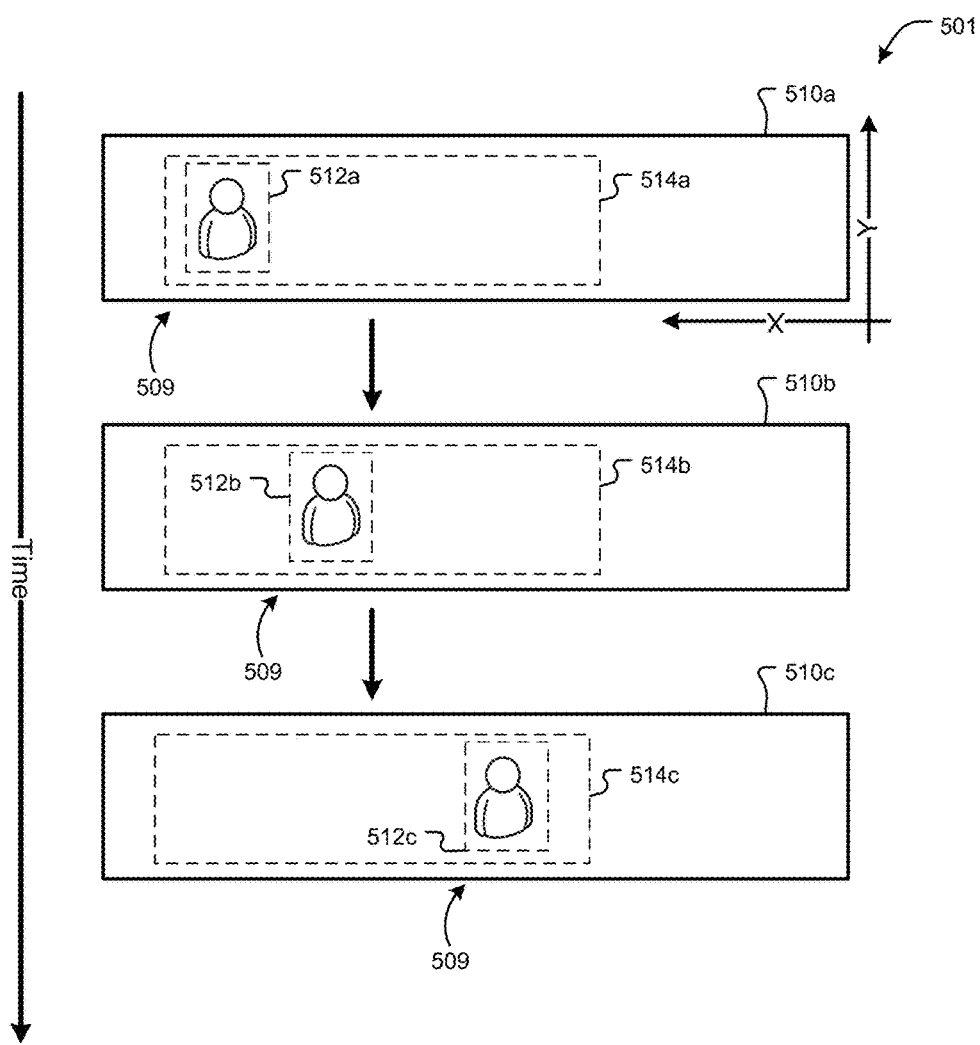
FIG. 10B is a diagram showing frames of a video including a region-of-interest.

FIG. 10B is a diagram showing frames 510*a*-510*c* of a video 501 including a region-of-interest 509. In the example of FIG. 10B, the pixel area of the position of the region-of-interest in the frames 510*a*, 510*b*, 510*c* moves from left-to-right as the frames progress. (For example, the pixel area of the region-of-interest 509 may be the figure of a person.) The summarization engine 2 may use any suitable technique to crop the frames 510*a*, 510*b*, 510*c* to create a content clip. For example, the summarization engine 2 may crop the frames 510*a*, 510*b*, 510*c* to the boxes 512*a*, 512*b*, 512*c*, which include the pixel area of the region-of-interest 509 as its position changes. In some examples, the summarization engine 2 may crop to a larger box 514*c* that includes the pixel area of the region-of-interest 509 across all of the positions that it takes in the frames 510*a*, 510*b*, 510*c*.

Figure 11:
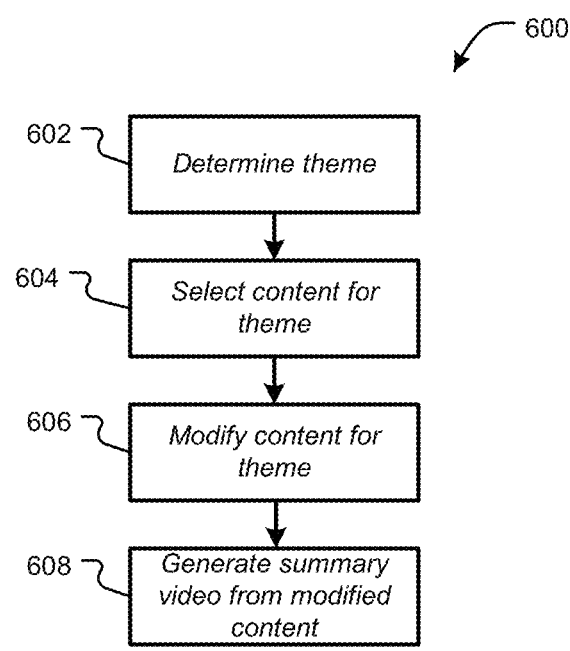
FIG. 11 is a flow chart showing one example of a process flow that may be executed by the summarization engine to generate a summary video from a set of content clips.

FIG. 11 is a flow chart showing one example of a process flow 600 that may be executed by the summarization engine 2 to generate a summary video from a set of content clips. At 602, the summarization engine 2 may determine a theme for the summary video. The theme may be determined in any suitable manner. For example, the theme may be received from a user device as described in timeline 300 above (e.g., 330). Also, for example, the summarization engine 2 may determine the theme based on the objects detected in the received content. For example, content including images and/or videos of fish, diving masks, etc. may be given an underwater theme. Content including images and/or video of a birthday cake may be given a birthday theme. Content including images and/or video showing a Christmas tree may be given a holiday theme. At 604, the summarization engine may select and/or assembly content clips to be included in the summary video. Content clips may be selected in any suitable manner. For example, if the theme is a birthday party, selected content clips may include clips showing regions-of-interest related to specific people (e.g., the person having a birthday), regions-of-interest related to specific actions (e.g., blowing out birthday candles), etc. The number of clips may be determined, for example, considering the length of the clips and the total length of the summary video. The total length of the summary video may be selected by the user (through the user device) and/or set by the summarization engine 2 to a default value. In some examples, the summarization engine 2 may set the length of the summary video to a threshold value. In some examples, the summarization engine 2 may set the length of the summary video to a value proportional to the number and/or length of videos and/or images received.

At 606, the summarization engine 2 may modify the selected content clips according to the theme. In some examples, the summarization engine 2 may modify the length of the content clips to match a tempo of the theme. For example, the summarization engine 2 may trim frames from content clips to set their length. The summarization engine 2 may cut extra frames added around the region-of-interest or, in some examples, may cut frames depicting part of the region-of-interest. The length to which the content clips are cut may be selected to match a tempo of the theme for the summary video. For example, the tempo may be an indication of a frequency at which the summary video will cycle between content (e.g., how quickly the summary video will move from one content clip to another (e.g., a new content clip may be displayed every 1-5 second and/or 5-10 seconds). Matching content clips to a tempo may comprise cutting the clips to a length of time indicated by the tempo.

In some examples, if a clip has a humorous theme, content clips may be set to between 1 and 5 seconds in length. More serious themes may have longer clip lengths, such as 5-10 seconds. For example, if the theme is a dance party, the tempo of the theme may be upbeat and the content clips may be modified to a shorter length. If the theme is a wedding ceremony, for example, the tempo may be slower and the content clips may be modified to a longer length. In some examples, all of the content clips may be cut to the same length or may be cut to different lengths. In some examples, the content clips may be cut to a length matching music or other audio to be added to the summary video, described at 608. Additional modifications may be made to the content clips before and/or after cutting. In some examples, a color, brightness, or other image property of the content clips may be modified. For example, some themes may specify black and white or sepia-themed colors. Some themes may call for more saturated colors, cooler colors, etc. Accordingly, the summarization engine 2 may apply a color filter to the content clips to, for example, add a color specified by the theme. In some examples, other visual effects may be applied to modify the content clips including, for example, changes to the playback speed, the addition of framing or other graphics, light lead or lens flare features, split-screen features whereby multiple frames are displayed simultaneously, stacked-screen features whereby multiple frames are displayed in a partially-overlapping manner. In some examples, a theme may specify a transition between content clips in the summary video. Example transitions may include wipe across, application of a growing or shrinking mask, pop-in, slide-out, fade, etc. In some examples, a theme may specify a special effect to be applied to some or all of the content clips of the summary video. Example special effects include shape overlays, graining effects, halftone patters, lens flares, etc.

At 608, the summarization engine 2 may generate a summary video from the content clips modified at 606. Generating a summary video may comprise ordering and joining the various content clips. In some examples, as described with respect to FIG. 6, ordering may be completed before the modifications of 606. Generating the summary video may also comprise setting the joined content clips to music or another soundtrack. The music or soundtrack may be selected automatically by the summarization engine 2 based on the theme or, in some examples, is selected by the user (through the user device). For example, some themes may be associated with a catalog of soundtracks. The summarization engine 2 may select a soundtrack from the catalog and/or prompt the user device to provide an indication of a soundtrack selected from the catalog. In some examples, transitions between content clips in the summary video may be synchronized to the sound track. For example, when the soundtrack is a song, the summarization engine 2 may cause the summary video to switch from one content clip to another content clip at selected points in the song (e.g., upbeats, downbeats, etc.).

FIGS. 12-15 are screen shots showing screens 702, 704, 706, 708 of an example user interface 700 that may be provided to a user 6 by the summarization app 22. Referring to FIG. 12, the interface 700 shows a menu screen 702. The menu screen 702 may include title frames 720, 722, etc. for summary videos that have been created and/or are in the process of being created. Each title frame 720, 722 may include a title 724 of the associated summary video. In some examples, the title is initially chosen by the summarization app 22. For example, the title frame 720 is labeled with a date on which some or all of the content for the associated summary video was captured. The user 6 may select one or more of the title frames 720, 722 and/or field 726 to modify properties of the respective summary videos.

FIG. 13 shows a configuration screen 704 that may be displayed by the interface 700 after the user 6 selects a title frame or other screen. The configuration screen 704 may allow the user 6 to set and/or modify properties of the summary video. When the user 6 sets or changes a property of the summary video, the summarization app 22 may send the change to the summarization engine 2 as an instruction or a new instruction, as the case may be. The screen 704 comprises example property fields 730, 732, 734, 736, 738, 740. The user 6 may select the title field 730 to set and/or change a title of the summary video. The user 6 may select the media field 732 to set and/or change the content that is to be considered for inclusion in the summary video. The user 6 may select a people field 734 to identify people regions-of-interest identified by the summarization app 22 and/or the summarization engine 2. For example, when the user 6 selects the people field 734, the summarization app 22 may display frames to the user 6 showing people regions-of-interest that have been identified in the content. The user 6 may identify the people. This may allow the summarization engine 2 to select clips for summary video to include specific people. The user 6 may select the duration field 736 to set or modify a duration or total length of the summary video. The user 6 may select a theme field 738 to set or modify a theme for the summary video. The user 6 may select the music field 740 to set or modify a soundtrack for the summary video.

FIG. 14 shows a title modification screen 706 that may be displayed to the user 6 when the title field 730 is selected. The screen 706 comprises an indication of a title of the summary video and an optional subtitle. When the user device executing the summarization app 22 does not include a hardware keyboard, a soft keyboard 742 may be displayed to allow the user 6 to enter and/or modify the title and/or subtitle. FIG. 15 shows a theme modification screen 706 that may be displayed to the user 6 when the theme field 738 is selected. The theme modification screen, as shown in FIG. 15, is configured to show an example frame 746 from the content to be included in the summary video (e.g., the title frame). A color filter field 744 may allow the user 6 to select a color filter to be applied to the summary video. Example color filters shown in FIG. 15 include Comics filter, a Realish filter, a 1970's filter, a black and white or B&W filter, etc. The user 6 may select one of the color filters from the field 744 to have that filter applied to content during creation of the summary video.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for creating a summary video from user content, the method comprising:
 receiving, by a summarization engine and from a user device, a plurality of videos, and wherein a first video of the plurality of videos comprises a plurality of frames;
 receiving, by the summarization engine and from the user device, an instruction to generate the summary video from the plurality of videos, wherein the instruction indicates a requested length of the summary video and a theme for the summary video, and wherein the theme is associated with a first tempo;

selecting, by the summarization engine, from the first video a title frame for the summary video;

sending, by the summarization engine, the title frame to the user device;

identifying, by the summarization engine, a plurality of regions-of-interest selected from the plurality of videos, wherein a first region-of-interest selected from the plurality of regions-of-interest comprises a pixel area and a set of frames in which the pixel area appears;

generating, by the summarization engine, a plurality of content clips, wherein a first content clip selected from the plurality of content clips comprises the first region-of-interest, and wherein the first content clip has a first length and a second content clip has a second length different than the first length;

after generating the plurality of content clips, receiving, by the summarization engine and from the user device, a new instruction, wherein the new instruction comprises a new requested length of the summary video and a new theme of the summary video, wherein the new theme of the summary video is associated with a new tempo associated with shorter content clip durations than the first tempo; and generating, by the summarization engine, the summary video, wherein generating the summary video comprises:

selecting the first content clip for inclusion in the summary video;

determining a reduced time length for the first content clip, wherein the reduced time length matches the new tempo;

generating a reduced first content clip having the reduced time length; and joining the reduced first content clip with at least the second content clip from the plurality of videos to form the summary video, wherein the summary video has the new requested length.

2. The method of claim 1, further comprising, after generating the plurality of content clips, and before receiving the new instruction, selecting an initial set of content clips, wherein selecting the initial set of content clips comprises identifying a region-of-interest associated with the theme; and modifying a length of at least one of the initial set of content clips to match the first tempo.

3. The method of claim 1, further comprising:

receiving a second new instruction, wherein the second new instruction comprises a second new requested length of the summary video and a second new theme of the summary video, wherein the second new theme of the summary video is associated with a second new tempo, the second new tempo associated with content clip durations different than the new tempo, further comprising:

selecting the first content clip for inclusion in the summary video;

determining a second reduced time length for the first content clip, wherein the second reduced time length matches the second new tempo;

generating a new reduced first content clip having the second reduced time length; and joining the new reduced first content clip with at least a third content clip from the plurality of videos to form a second summary video, wherein the second summary video has the second new requested length.

4. A computer-implemented system for creating a summary video of user content, the system comprising:

a summarization engine, the summarization engine comprising at least one processor and operatively associated memory, wherein the summarization engine is programmed to:

receive a first indication to create the summary video;

receive a first input variable for the summary video;

receive user content to summarize, the user content comprising a plurality of frames of data;

determine a first frame of data included in the plurality of frames of data;

identify a first subset of pixels of the first frame of data representing a first region-of-interest, wherein the first region-of-interest appears in each frame of a first set of frames;

determine a second frame of data included in the plurality of frames of data;

identify a second subset of pixels of the second frame of data representing a second region-of-interest, wherein the second region-of-interest appears in each frame of a second set of frames;

generate a first content clip, wherein the first content clip comprises the first region-of-interest and has a first time length, and wherein generating the first content clip comprises, for each frame in the first set of frames, cropping the frame to a corresponding pixel area in which the first region-of-interest appears and a threshold number of buffer pixels outside the corresponding pixel area;

generate a second content clip, wherein the second content clip comprises the second region-of-interest and has a second time length;

receive a new input variable for the summary video;

determine a modified first time length of the first content clip;

generate a modified first content clip having the first modified time length;

determine a modified second time length of the second content clip;

generate a modified second content clip having the second modified time length; and generate the summary video, the summary video including the modified first content clip and the modified second content clip.

5. The system of claim 4, wherein the new input variable is received after generating the first content clip and the second content clip, wherein the new input variable comprises a new length for the summary video.

6. The system of claim 4, wherein the new input variable is received after generating the summary video, wherein the new input variable comprises a new summary video length, and wherein the summarization engine is further programmed to:

determine a new first modified time length of the first content clip;

generate a new first modified content clip having the new first modified time length;

determine a new second modified time length of the second content clip;

generate a new second modified content clip having the new second modified time length; and generate a second summary video including the new first modified content clip and new second modified content clip.

7. The system of claim 4, wherein identifying the first subset of pixels of the first frame of data comprises identifying a tagged pixel area and a tagged set of frames from the user content.

8. The system of claim 4, wherein identifying the second subset of pixels of the second frame of data comprises detecting a first object in the second frame of data.

9. The system of claim 4, wherein identifying the first subset of pixels of the first frame of data comprises detecting motion of an object between the first frame of data and the second frame of data.

10. The system of claim 4, wherein generating the first content clip comprises cropping a first frame from the first content clip to an aspect ratio, wherein the first frame also comprises at least a portion of the first frame of data representing the first region-of-interest.

11. The system of claim 4, wherein the first content clip comprises:
   a first plurality of frames of data comprising the first region-of-interest; and
   a first buffer set of frames positioned before the first plurality of frames of data in a first video; and
   a second buffer set of frames after the first plurality of frames of data in the first video.

12. The system of claim 4, wherein the first region-of-interest appears at a first position in the first frame of data and at a second position different from the first position in the second frame of data.

13. The system of claim 4, wherein the first input variable indicates a first color filter and the new input variable indicates a second color filter, and wherein the summarization engine is further programmed to:
   apply the first color filter to the first content clip; and
   after receiving the new input variable, apply the second color filter to the first content clip.

14. The system of claim 4, wherein the first region-of-interest comprises pixels representing a face.

15. The system of claim 4, further comprising a user device, wherein the user device comprises at least one processor and operatively associated memory, and wherein the user device is programmed to:
   receive, from a user, a length for the summary video; and
   send the length for the summary video to the summarization engine.

16. A method for creating a summary video of user content, the method comprising:
   receiving, by a summarization engine, a first indication to create the summary video, wherein the summarization engine comprises at least one processor and associated memory;
   receiving, by the summarization engine, a first input variable for the summary video;
   receiving user content to summarize, the user content comprising a plurality of frames of data;
   determining, by the summarization engine, a first frame of data included in the plurality of frames of data;
   identifying, by the summarization engine, a first subset of frame data representing a first region-of-interest, wherein the first subset of frame data is a first portion of the first frame of data;
   determining, by the summarization engine, a second frame of data included in the plurality of frames of data;
   identifying, by the summarization engine, a second subset of frame data representing a second region-of-interest, wherein the second subset of frame data is a second portion of the second frame of data;
   generating, by the summarization engine, a first content clip, wherein the first content clip comprises the first region-of-interest and has a first time length;
   generating, by the summarization engine, a second content clip, wherein the second content clip comprises the second region-of-interest and has a second time length;
   receiving, by the summarization engine, a new input variable for the summary video, wherein the new input variable comprises a theme for the summary video, the theme being associated with a tempo;
   determining, by the summarization engine, a modified first time length of the first content clip, wherein determining the modified first time length is based at least in part on the tempo;
   generating, by the summarization engine, a modified first content clip having the first modified time length;
   determining, by the summarization engine, a modified second time length of the second content clip;
   generating, by the summarization engine, a modified second content clip having the second modified time length; and
   generating, by the summarization engine, the summary video including the modified first content clip and the modified second content clip.

17. The method of claim 16, wherein the first input variable comprises a first theme for the summary video and the new input variable comprises a new theme for the summary video, further comprising:
   before receiving the new input variable, selecting, by the summarization engine, the first content clip for inclusion in the summary video, wherein the first region-of-interest shows an object associated with the first theme; and
   after receiving the new input variable, selecting, by the summarization engine, the first content clip for inclusion in the summary video, wherein the object is also associated with the new theme.

18. The method of claim 16, wherein generating the modified first content clip comprises modifying a playback speed of a set of frames of the first content clip.

* * * * *